(No Model.)

I. PENNINGTON.
SNAP HOOK.

No. 440,056. Patented Nov. 4, 1890.

Witnesses:
E. P. Ellis
J. M. Nesbit

Inventor:
I. Pennington
per F. A. Lehmann,
Atty

UNITED STATES PATENT OFFICE.

ISAAC PENNINGTON, OF TIFFIN, OHIO.

SNAP-HOOK.

SPECIFICATION forming part of Letters Patent No. 440,056, dated November 4, 1890.

Application filed May 1, 1890. Serial No. 350,170. (No model.)

*To all whom it may concern:*

Be it known that I, ISAAC PENNINGTON, of Tiffin, in the county of Seneca and State of Ohio, have invented certain new and useful Improvements in Snap-Hooks; and I do hereby declare the following to be a full, clear, and exact description of the invention, such as will enable others skilled in the art to which it pertains to make and use it, reference being had to the accompanying drawings, which form part of this specification.

My invention relates to an improvement in snap-hooks; and it consists in the particular construction which will be fully described hereinafter.

Figure 1:
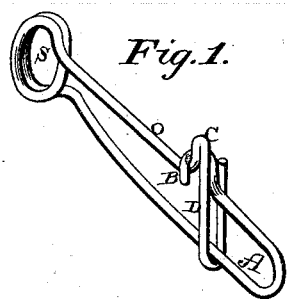
Figure 2:
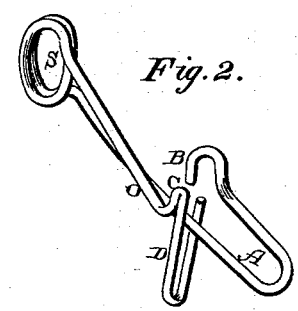

The object of my invention is to produce a wire snap-hook which is light, cheap, and simple in construction, and which is perfectly safe and durable in operation.
Figure 1 is a perspective of a snap-hook closed. Fig. 2 is a similar view showing the snap-hook opened.

In making these snap-hooks I take a single piece of wire if it is sufficiently strong and heavy to form a hook of only a single thickness; but if the wire is not sufficiently strong or heavy the wire may be first doubled and then twisted together, or any one portion may be twisted or doubled so as to make it stronger, as may be desired. The wire, whether single or double, is first formed into a coil S at its center, so as to form a spring, and then the two ends are given the desired shape. That end which is to be formed into the hook A is given the desired shape, and then the end of the wire at the inner end of the hook is made to project upward at about right angles, so as to form the hooked catch B of any desired shape, and which is intended to engage with the other end of the wire, and thus prevent any severe strain upon the hook from straightening it out. The opposite end O of the wire from the hook extends outwardly at any suitable angle, and then the wire is bent at about right angles, so as to form the projection C, which catches against the outer side of the catch B and serves to brace and strengthen the catch and the hook A at this point. From the projection C the wire is formed into a long narrow hook D, through which the hook A passes, and which hook D forms a guide to control the movement of this end of the wire and also return the parts to position. As this hook D catches upon opposite sides of the hook A, all lateral play or movement is prevented, and the projection when the snap is closed always returns to position outside of the catch B.

Before the hook can be opened, whether it is made of a single or doubled thickness of wire, the movable portion O of the snap must be depressed, so as to open the hook A, and then when the movable portion of the snap is released the guiding hook or hooks guide the parts back into position.

Having thus described my invention, I claim—

A snap-hook made from a wire which is formed into a spring at its center, and which has one end of the wire formed into the hook A and catch B and the other end of the wire or movable portion of the snap provided with a projection to catch behind the catch, and a guiding-hook which catches upon opposite sides of the hook A, substantially as set forth.

In testimony whereof I affix my signature in presence of two witnesses.

ISAAC PENNINGTON.

Witnesses:
W. O. DILDINE,
CORINNE GRIFFIN.